July 12, 1966    H. HURWITZ, JR., ET AL    3,260,867
METHOD OF ELECTRIC POWER GENERATION
Filed March 31, 1961
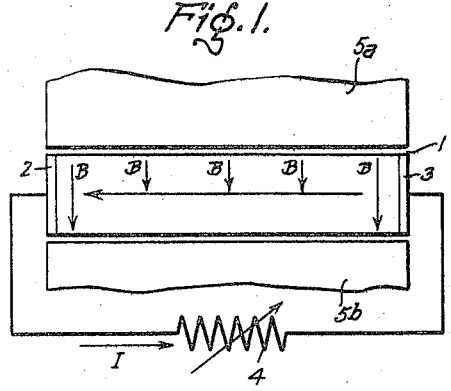
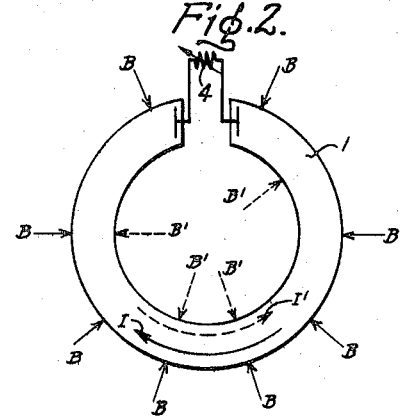
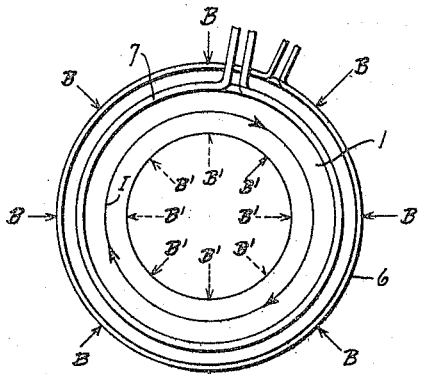
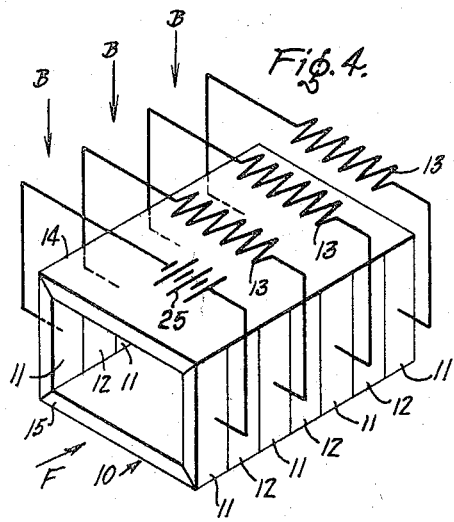
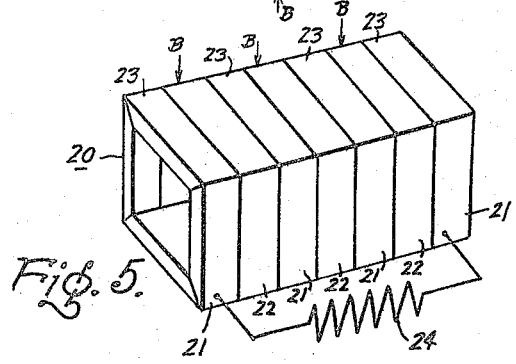
Inventors
Henry Hurwitz Jr.
George W. Sutton
by Allen M. Sutton
Their Attorney

3,260,867
METHOD OF ELECTRIC POWER GENERATION
Henry Hurwitz, Jr., Schenectady, N.Y., and George Walter Sutton, Lafayette Hill, Pa., assignors to General Electric Company, a corporation of New York
Filed Mar. 31, 1961, Ser. No. 99,751
5 Claims. (Cl. 310—11)

This invention relates to a method of generating electric power, and, more particularly, to an improved method of generating electric power by the interaction of a moving conducting fluid and a magnetic field.

Conventional rotating devices for generating electricity are based on the principle of first converting heat energy to rotational mechanical energy, typically in a prime mover such as a steam turbine, and then converting the mechanical energy into electrical energy by driving a metallic conductor through a magnetic field. For economical operation of such turbine powered generating systems, high thermal conversion efficiencies in the steam turbine are imperative. The various improvements in turbine efficiencies that have been effected in the past have been achieved by operating at ever higher temperatures and pressures. As these rise, the problems they generate multiply so rapidly that a limit is quickly reached in what may be accomplished by further increases in operating temperatures and pressures. Probably the greatest difficulties arise in the materials area, since the mechanical stresses on moving parts such as turbine blades, shafts, etc., become progressively more severe as operating temperatures and pressures increase. Consequently, a "diminishing returns" effect has set in and improvements in efficiency have been achieved in smaller and smaller increments and at higher and higher costs. Many of these difficulties can be avoided and radical improvements in conversion efficiencies can be effected by completely eliminating those elements which limit performance and devising a system that does not have any moving mechanical components.

To this end, it has been proposed to generate electricity by abstracting energy from a moving conducting fluid, preferably a gaseous one, as it passes through a magnetic field without employing rotating or moving parts merely by impressing a pressure difference on the fluid. Mechanical prime movers, such as turbines are, therefore, no longer necessary and a generating system without any moving parts is feasible. The body of scientific knowledge dealing with the interaction of a conducting gaseous fluid with a magnetic field is commonly known as magnetohydrodynamics (usually abbreviated to MHD) and all subsequent references in this specification to the generation of electrical power by the interaction of a conducting fluid and a magnetic field will be to magnetohydrodynamic generation or MHD generation.

A typical example of an MHD generating system as conceived by previous workers in the field is described in detail in Patent No. 1,717,413 issued June 18, 1929 to R. Rudenberg, which contemplates bringing a gas stream to a conducting condition by heating it to a temperature at which it becomes partially ionized. The ionized gas stream is driven through a magnetic field by a pressure difference, causing an electromotive force (E.M.F.) to be generated in the gas. Under the influence of this E.M.F. such charged particles as are present in the gas are deflected to a pair of electrodes causing a unidirectional or direct current to flow through an external load circuit connected to the electrodes.

An alternating current MHD generator is described in the copending application of Emmeth A. Luebke, Serial No. 39,590, filed June 29, 1960, and assigned to the assignee of the present invention. In that device the conducting gaseous medium is driven along an annular path through a varying radial magnetic field and the interaction of the moving conducting medium with the varying magnetic field produces a circulating current within the conducting medium itself. The circulating current induces a time varying output electromotive force in an output coil wound around the flow path.

Both of these types of MHD generating systems are characterized by difficult maintenance problems, because of the rugged environment to which the construction material is exposed. The electrodes and confining walls for the conducting gaseous medium are exposed to temperatures of several thousand degrees Kelvin, which are necessary to obtain the required ionization of the gas. Thus far, it has been impossible to increase the power output by increasing the degree of ionization because of the deleterious effect on the electrodes and/or the wall material when the temperature of the gaseous conducting medium is further raised. Therefore, it is a primary object of this invention to provide a method of operating magnetohydrodynamic generators by means of which the power output may be increased without increasing the temperature of the gaseous conducting medium, and by means of which the temperature of the gas may even be reduced below that heretofore considered necessary without affecting the power output from the device.

Another object of the invention is to provide a method of generating electrical power in an MHD apparatus in which the degree of ionization is not dependent solely upon the temperature to which the gaseous conducting medium is heated.

It is another object of the invention to provide a method of generating electrical power in an MHD device by means of which the temperature of the electrons in the gaseous conducting medium is considerably higher than that of the gaseous conducting medium itself.

Other objects and advantages will become apparent as the description of the invention proceeds. Briefly, these are realized by operating magnetohydrodynamic generating apparatus in such a manner as to cause the electron temperature to be substantially higher than that of the moving gaseous medium. This may be done by increasing the degree of initial ionization in the gas, by making the product of the electron angular cyclotron frequency and the mean collision time in the gaseous medium greater than unity, by providing an electric field within the gas which has components both parallel and perpendicular to the desired direction of current flow, or by permitting an electric field to develop in the gas and by controlling the ratio of output voltage to open circuit voltage. As will be pointed out in detail hereafter, all of these steps tend to increase the electron temperature within the moving gaseous medium, and hence increase the degree of ionization.

The novel features which are believed to be characteristic of the invention are set forth in the appended claims. The invention itself, however, together with further objects and advantages thereof, may best be understood by reference to the following description taken in conjunction with the accompanying drawing, in which:

FIGURE 1 is a schematic illustration of a direct current MHD generator useful in understanding the present invention;

FIGURES 2 and 3 are schematic illustrations of alternating current MHD generators; and FIGURES 4 and 5 are schematic illustrations of direct current MHD generators to which the method of the present invention may be applied.

Before discussing MHD generation according to the principles of this invention, it will be useful to discuss some pertinent physical properties of gaseous fluids, the conditions under which they become conducting, and the manner in which the conductive condition may be achieved to facilitate interaction with a magnetic field. The basic properties of pure gases or of gas mixtures, such as air, are such that under normal circumstances of temperature and pressure the conductivity of the gas is so low that for all practical purposes the gas is non-conducting and no interaction with a magnetic field is possible. To achieve significant results, the conductivity of the gaseous fluid must be increased in some manner. The preferred method of enhancing the gas conductivity is by partially ionizing the gas, causing a fraction of the gas molecules to lose one or more electrons. The resulting charged particles are free to drift through the gas and may give rise to current conduction by interaction with a magnetic field.

The gas may be ionized in any one of several ways, as by the thermal ionization, electric field ionization, X-ray ionization, etc. Because of the relative ease and effectiveness with which it may be carried out, the preferred method used thus far in MHD generating systems is by thermal ionization, i.e., adding heat energy to the gas until some of the gas molecules lose electrons. The thermal ionization process is, however, severely temperature dependent, and is also a discontinuous phenomenon; i.e., there is a threshold temperature range below which insufficient ionization takes place. The ionization energy, by which is meant the thermal energy increment which must be added to the molecules to initiate ionization and tear loose one or more of its electrons, is quite high for most gases. Common gases, such as air, CO, $CO_2$, as well as noble gases, show no perceptible ionization unless the gas is heated above a threshold temperature of approximately 3500° K. (2800° F.). It will be appreciated that the problems involved in heating the gas to an operating temperature, which must be even higher than the ionization threshold temperature of 3500° K., are substantial both in terms of the magnitude of the effort required to heat the gas and in terms of the problem of finding materials capable of withstanding such temperatures.

Fortunately, these difficulties may be reduced by a technique which substantially lowers the critical threshold temperature for ionization. It has been found that by adding a small amount, in the range of 0.1–1% by volume, of some easily ionizable material, such as an alkaline metal vapor, for example, the threshold ionization temperature is reduced by as much as 40–50%.

For example, by "seeding" clean air through the addition of 1% or less by volume of potassium vapor, the critical ionization threshold temperature is reduced from 3500° K. (5800° F.) to 2000° K. (3600° F.). Cesium (Cs), potassium carbonate ($K_2CO_3$), cesium carbonate ($CsCO_3$) are additional examples of alkaline metal vapors or compounds which are effective for this purpose. For a more thorough discussion of electrical conductivity by thermal ionization, reference is hereby made to an article entitled "Electrical Conductivity of Thermally Ionized Air Produced in a Shock Tube," Lamb, Lawrence, and Lynn, Journal of Applied Physics, volume 28, July, 1957.

The conducting gas after seeding is in suitable condition for expansion through a conventional expansion nozzle, after which it is caused to pass through a magnetic field of suitable configuration to establish a current within the conducting gas. The manner in which direct or alternating current is generated within the gaseous fluid may be most easily understood in connection with the schematic illustrations of FIGURES 1–3 of the accompanying drawing. In FIGURE 1, a conventional prior art D.C. MHD arrangement is shown as including an elongated rectangular fluid passage or duct 1, extending into the plane of the paper. Metallic electrodes 2 and 3 are disposed in the duct and are connected to a load circuit which, for simplicity of explanation and illustration, is shown as a simple variable resistance 4. The duct is disposed between the pole pieces 5a and 5b of a suitable magnet. If the direction of gas flow is into the plane of the paper and a magnetic field of constant flux density is applied at right angles to the direction of flow, as illustrated by the arrows labeled B, an E.M.F. is generated in the conducting gas at right angles both to the field and to the direction of flow. This E.M.F. acts on the free electrons in the ionized gas and causes an electron current to flow between electrodes 2 and 3 and through the load 4 in the direction shown by the arrow I. If the direction of gas flow is reversed, the current flow is in the opposite direction.

If the rectangular duct 1 shown in FIGURE 1 is bent into the partially closed toroid shown in FIGURE 2, the interaction of the moving fluid and the magnetic field produces current flow between the electrodes 2 and 3 in the direction shown by the solid arrow I, provided that the magnetic field is at right angles to the direction of fluid flow at all points, i.e., normal to the periphery of duct 1. As can be seen by observation, in order to fulfill this requirement the applied field, as illustrated by the solid arrows B, must be radial. If the field is reversed, as shown by the broken-line arrows B', the current reverses as shown by the broken-line arrow I'.

Modifying the duct configuration still further, and constructing it in the shape of the closed annulus of FIGURE 3, establishes a conductive path entirely within the conducting gas and provides an electrodeless current flow. The interaction of the radial magnetic field B and the gaseous conductor flowing into the annular duct establishes an E.M.F. around the annular path which acts on the electrons and causes a circulating electron current I to flow entirely within the gas. Electrodes 2 and 3 are, therefore, no longer needed to complete the electrical circuit and may be eliminated. If the direction of the magnetic field is reversed, as shown by the broken-line arrows B', the direction of the circulating current will be reversed as shown by the broken-line arrow I'.

By a proper combination of duct configuration and a radially shaped magnetic field, a circulating current is established entirely within the gas, and electrodes are no longer needed to complete the current path. However, the magnitude and direction of rotation of the circulating current must vary with time so that it may be utilized to generate alternating current power. To this end, the direction of the radial magnetic field is periodically reversed by connecting a field producing coil 6 to a suitable source of alternating current (not shown). The magnitude of the circulating current varies correspondingly, so that the direction of current flow changes from clockwise to counterclockwise during each cycle of the field. A toroidal magnetic field, which varies in magnitude and direction, links the circulating current and is transported along the duct by the moving fluid. The time varying toroidal magnetic field associated with the current ring may then be used to induce an alternating E.M.F. in suitable output windings 7. In short, by controlling the direction of the magnetic field across the annular gas flow path, the direction and magnitude of the induced circulating current is cyclically varied and an alternating E.M.F. is generated.

In magnetohydrodynamic generators, it is known that the amount of current flowing between the electrodes in a direct current device, or the amount of current generated in an output winding in an alternating current device, is dependent upon a number of factors. Among these are the degree of ionization of the gaseous working medium, the strength of the magnetic field applied across the duct, the velocity and density of the gaseous working medium as it passes through the magnetic field, and various parameters of duct and electrode configuration. Until now, it has been presumed that the degree of ionization of the gaseous working medium was dependent strictly upon the temperature to which the medium was heated. This, of course, placed severe demands upon the materials of which the duct and electrons were constructed, because they were exposed to temperatures of several thousand degrees Kelvin from a gas passing therethrough with a velocity at least equal to that of the speed of sound. As to the other parameters effecting the generation, there are physical limitations on the strength of the magnetic field that may be employed inasmuch as the amount of iron and/or copper required becomes prohibitively large; and of course, the velocity of the gaseous conducting medium as it passes through the duct cannot be increased indefinitely, again because of the materials problem.

It has now been discovered that ionization and consequent current flow may be considerably enhanced by operating the generator in a manner such that the temperature of the electrons is considerably higher than that of the gaseous medium in which they are carried, or, in other words, by utilizing non-thermal ionization.

The reason for the increased electron temperature is as follows: as viewed by an observer who is moving with the mean gas velocity, the electrons are subject to an electric field which is the sum of the magnetically induced electric field and the electric field caused by the electrodes. These fields accelerate the electrons in the direction opposite to the total electric field. As they are accelerated, they acquire additional translational velocity, and hence kinetic energy. They cannot accelerate indefinitely, however, since eventually they will collide with an electrically neutral particle or ion. Now, it is a physical principle that when an electron collides elastically with a neutral or ionized atom, because of the large mass ratios, the electron loses very little of its velocity, but the direction is changed. For a large number of electrons, their motion is said to become thermalized. Thus, the magnetically induced electric field increases the kinetic energy of the electrons, which is then converted into thermal energy by subsequent collisions. It is this phenomenon which raises the temperature of the electrons above the gas temperature. Furthermore, since ionization of the seed material is very sensitive to the temperature of the electrons, the increased electron temperature will substantially increase the fraction of seed atoms which are ionized. It is thus possible to use a lower gas temperature and still achieve sufficient ionization to convert the gas into a good conductor of electricity.

The present invention is directed towards methods of raising the electron temperature above the temperature of the working gas, among which are to maintain the product of the cyclotron frequency of the electrons in radians per second, and the mean collision time of the electrons in the gaseous medium as large as practical. $\omega$, the cyclotron frequency of the electrons, is dependent upon the strength $B$ of the magnetic field through which they pass, and is equal to $2.8 \times 10^6 B$. As previously mentioned, there are practical limitations as to the ultimate strength of the magnetic field in that the means of producing the field become prohibitively large physically and consume too much power for efficient operation. It is possible to obtain a magnetic field of 50,000 gauss or more, but in practical operation the magnetic field may be maintained at a considerably lower values. $\tau$, the mean electron collision time, is the average time that elapses between collisions of electrons and is inversely proportional to the density of the working gas. Therefore, $\tau$ can be increased by decreasing the density of the working gas, although again there are practical limitations in that if the density is reduced too far there will be an insufficient number of atoms available to provide a practical power density. It has been found that optimum operation may be obtained if the product of $\omega$ and $\tau$ is greater than unity and preferably is in the region of 3-5. Smaller values of the product do not lead to sufficient heating, whereas much larger values are both difficult to achieve with practical magnitudes of magnetic field and gas density, and also may give rise to hydromagnetic instabilities which impair operation of the device.

It is known that if electrons pass through an electric field gradient, they are heated because of their increased velocity and may reach a temperature substantially higher than that of the gaseous medium. A possible means of accomplishing this effect is to apply an electric field across the duct by external means. However, here the matter of economics enters in, because the power required to provide the electric field subtracts from the over-all efficiency of the generator. In accordance with the present invention, a preferred method of obtaining such a field is to permit it to develop automatically within the duct in a manner to be explained in detail hereafter.

It is well known that a gaseous conducting medium flowing through a transverse magnetic field sets up an electric current in the direction of gas flow. Therefore, if electrodes are used which are long in the axial direction, they provide a return path for the current that is caused to flow in the axial direction. This phenomenon is known as the Hall effect, and the current which flows as a result thereof is known as the Hall current. In a direct current MHD generator of the general configuration of that shown in FIGURE 1, a Hall current will flow, and the current flowing between the two electrodes is reduced. As will be later explained, this can be eliminated in a direct current device. In an alternating current MHD generator, such as is shown generally in FIGURE 3, there is no Hall current flowing because there are no electrodes to provide a return path for the current. Therefore, in that device, an electric field exists in the direction of flow of the gaseous working medium.

FIGURE 4 illustrates schematically a direct current magnetohydrodynamic generator in which the Hall current is eliminated. In this case, a flow path or duct 10 has side walls which consist of a plurality of pairs of electrodes 11, with the electrodes on each side being separated by an insulating material 12. The two electrodes 11 of each pair are indirectly opposite each other in the duct, and individual loads 13 are connected between the two electrodes of each pair. The top and bottom walls 14 and 15 of the duct are, of course, constructed of an insulating material. In this arrangement, because there is no continuous electrode to provide a return path for the Hall current, that current cannot flow. Therefore, the electric field which exists in the direction of gas flow F continues to exist and provides heating of the electrons in the gaseous working medium.

FIGURE 5 illustrates schematically a direct current MHD generator in which the Hall current itself is utilized to supply an electric load. Such a device is disclosed in detail in patent application Serial No. 60,994, filed October 6, 1960 by Cobine and Harris, and assigned to the assignee of the present invention.

Briefly, such a generator utilizing the Hall effect comprises a flow passage or duct 20 provided with segmented pairs of electrodes 21 spaced along the direction of fluid flow and separated by insulating spacers 22. Each pair of electrodes 21 is electrically connected by a bar or strip of conducting material 23 to complete a current path for the transverse electric current generated by the flow of gaseous conducting fluid through the magnetic field B applied across the duct. The Hall current generated axially is utilized to supply an electric load 24 connected between axially displaced electrodes, which, in the device illustrated, are those farthest apart, although other pairs of electrodes may be utilized for the purpose.

As previously pointed out, if electrodes which are long in the axial direction are used in a device such as that shown in FIGURE 1, they provide a very low resistance path for the Hall current and thus do not permit an electric field gradient to build up within the conducting gas in its direction of flow. Therefore, the electrons in the gas are not heated appreciably by passing through such a field. However, in the generator shown in FIGURE 5, the electrodes are segmented, and the load 24 does not present a low resistance path for the Hall current. Hence, an electric field gradient does exist in the direction of gas flow, as in the generator illustrated in FIGURE 4, and the temperature of the electrons is increased over that of the gas by a substantial amount. Of course, if the load is short circuited or presents a very low resistance, the axial field gradient will not develop. It is preferable, in the Hall current generator of FIGURE 5, as in the other generators described, to maintain the product of the electron angular cyclotron frequency and mean collision time in the range of 3–5.

It has been found that if the ratio K of output voltage to open circuit voltage can be maintained appreciably below unity, it will also increase the electron temperature. Of course, the ratio K cannot be reduced to too small a value for reasons of economy and efficiency of generation. The effect of maintaining K small is to allow ohmic dissipation within the gas between the electrodes which further increases the temperature of the electrons. In the preferred method of the invention, K is maintained in the range of approximately 0.5 to 0.9.

In order for the electron temperature to be substantially higher than that of the gas, it is necessary that spurious sources of electron energy loss such as inelastic collisions with molecules of the working gas or impurities be avoided. Therefore, the principle of this invention may be applied most effectively in systems in which the neutral working gas molecules and the ionized seed material molecules have no low lying excited states. A particularly suitable combination would be a rare gas such as helium or argon with an alkali metal vapor, such as cesium, as the seed material. Also, impurities should be eliminated to the maximum extent possible.

It is also important that the degree of ionization follow the electron temperature rather than the working gas temperature. For this to be the case, it is helpful to avoid de-excitation of the seed material atoms by collisions of the second kind with the working gas atoms and to make the system of sufficient physical size so that resonance radiation from the seed atoms is trapped. Here again the elimination of impurity molecules is of great importance.

If the ionization is to maintain itself at a level which corresponds to the temperature of the electrons, it is necessary that the electron density be sufficiently high. Since the gas as it enters the MHD generator may be almost completely un-ionized, it may be necessary to provide an initial high degree of ionization by action of a strong D.C. or A.C. electric field applied to the gas by external means. For example, in the device shown in FIGURE 4, the value of K may actually be made negative at the first pair of electrodes 11 by using an auxiliary source of E.M.F., illustrated as a battery 25, to change the sign of the potential difference between these electrodes. The electron temperature may be made extremely large by making K negative so that the ionization of the seed material can develop rapidly to a usable level. Since the pre-ionization is solely for the purpose of initiating ionization which is, according to the teachings of this invention, subsequently maintained by the method disclosed herein, the electrical energy required for pre-ionization can, with suitable design, be limited to a small fraction of the total output power of the generator. If such pre-ionization is not necessary, the battery 25 may be omitted and a load 13 substituted therefor.

In order to achieve the advantage of the principles of this invention, it is necessary to obtain a relatively uniform density of ionization in the working volume of the generator, and in particular to avoid the formation of constricted discharges, or narrow arc columns. Such localized and concentrated current flow could cause extensive turbulence and dissipation, thereby rendering the net efficiency undesirably small. An important means of avoiding these current constructions is to carefully control the concentration of seeding material. The concentration of seed material must first of all be large enough to provide sufficient ionization to carry the desired current density without the necessity of a voltage gradient, as seen by the moving plasma, which is so large as to incur the likelihood of constricted arc formation. Secondly, the concentration of seed material must not be so large as to make possible an undesirably large degree of ionization which would be undesirable both with regard to causing too high a concentration of power density and to allowing an unnecessarily large amount of energy to be diverted to the formation of ionization. The preferred range of normal operation is for the seed material to be ionized to the extent of 10% or greater. If in addition the ionization potential of the working gas is large compared to that of the seed material as would be the case with a helium-cesium combination, the ionization density is no longer a very rapidly increasing function of electron temperature. Hence local fluctuations in electric field or gas density which alter the electron temperature will under these conditions not cause intolerably large fluctuations of current density.

The actual choice of seed material concentration must be determined by calculation and/or experimental tests for the specific conditions of each MHD generator in accordance with the criteria which are taught by this invention. In most designs of practical interest the ratio of seed material to working gas atomic concentration should be in the range $10^{-4}$ to $10^{-3}$.

It has also been found that the electron temperature can be raised by increasing the velocity of gas through the duct. It is preferred that the gas velocity be at least Mach 1, and much higher Mach numbers are also possible. If the Mach number of the gas flow is increased by increasing the area ratio in the expansion nozzle while the stagnation temperature of the gas is held fixed, the velocity approaches an upper limit but the gas density reduction in going from the heat source through the expansion nozzle into the MHD duct becomes more pronounced. Thus operating at a Mach number far in excess of unity may be advantageous in that it makes possible the attainment of a high value of $\omega\tau$ in the duct without the need of an exorbitantly large magnetic field, while at the same time allowing the pressure of the working gas during the heating process prior to passing through the expansion nozzles to be high. It is found that by using the teachings of this invention in combination with relatively high Mach number it is possible for the electron temperature to substantially exceed the gas stagnation temperature.

It is pointed out that the method of electric power generation of the invention may be applied to either a direct current or to an alternating current magnetohydrodynamic generator which may be used in an open cycle or a closed cycle system.

In an alternating current device without electrodes, the Hall current is automatically suppressed, and it may be operated in accordance with the teachings of the invention so that the product of $\omega$ and $\tau$ lies in the preferred range. The electron heating is caused by the circulating current within the conducting medium. Of course, the other advantages resulting from electron density and gas velocity can be realized in an alternating current generator, as well as in a direct current generator.

It is now apparent that the invention attains all of its stated objects and provides a method whereby ionization and consequent output power in a magnetohydrodynamic generator may be substantially increased. Because of the method of the invention, the power output of an MHD generator can be increased without increasing the temperature of the gaseous conducting medium by increasing the temperature of the electrons in the gas and thereby increasing the degree of ionization.

It will be obvious to those skilled in the art that many variations and modifications of the disclosed method may be made without departing from the spirit and scope of the invention. Therefore, this invention is to be considered as limited only in accordance with the teachings thereof as set forth in the appended claims.

What we claim as new and desire to secure by Letters Patent of the United States is:

1. A method of generating electric power which comprises the steps of providing a heated gas which, at operating temperature, is essentially devoid of molecular energy states lower than the energy of electrons in said gas to avoid transfer of energy thereto by collisions with said electrons; introducing said gas into a magnetic field at a right angle to the lines of force thereof; controlling the relative values of said magnetic field and the density of said gas to provide a product of electron angular cyclotron frequency and mean collision time in the range of 3–5; providing a completed electrical circuit including a load for electric current generated by the interaction of said magnetic field and said gas; maintaining a ratio of voltage across the load to open circuit voltage in the range of 0.5 to 0.9; and utilizing a potential gradient across said gas in a direction parallel to the flow thereof to increase the temperature of said electrons relative to that of said gas.

2. A method of generating electric power which comprises the steps of providing a heated gas which, at operating temperature, is essentially devoid of molecular energy states lower than the energy of electrons in said gas to avoid transfer of energy thereto by collisions with said electrons; introducing said gas into a magnetic field at a right angle to the lines of force thereof; applying a transverse potential gradient across said gas perpendicular to the flow thereof adjacent the place of entry of said gas into said magnetic field to ionize said gas; controlling the relative values of said magnetic field and the density of said gas to provide a product of electron angular cyclotron frequency and mean collision time greater than unity; providing a completed electrical circuit including a load for electric current generated by the interaction of said magnetic field and said gas; maintaining a ratio of voltage across the load to open circuit voltage in the range of 0.5 to 0.9; and utilizing a potential gradient across said gas in a direction parallel to the flow thereof to increase the temperature of said electrons relative to that of said gas.

3. A method of generating electric power which comprises the steps of providing a gas which, at operating temperature, is essentially devoid of molecular energy states lower than the energy of electrons in said gas to avoid transfer of energy thereto by collisions with said electrons; heating said gas to a predetermined temperature; introducing said gas into a magnetic field at a right angle to the lines of force thereof through an expansion nozzle; controlling the relative values of the expansion in said nozzle and the predetermined temperature to produce a mixture velocity not substantially less than Mach 1; controlling the relative values of said magnetic field and the density of said gas to provide a product of electron cyclotron frequency and mean collision time in the range of 3–5; providing a completed electrical circuit including a load for electric current generated by the interaction of said magnetic field and said gas; maintaining a ratio of voltage across the load to open circuit voltage in the range of 0.5 to 0.9; and utilizing a potential gradient across said gas in a direction parallel to the flow thereof to increase the temperature of said electrons relative to that of said gas.

4. A method of generating electric power which comprises the steps of providing a gas which, at operating temperature, is essentially devoid of molecular energy states lower than the energy of electrons in said gas to avoid transfer of energy thereto by collisions with said electrons; heating said gas to a predetermined temperature; introducing said gas into a magnetic field at a right angle to the lines of force thereof through an expansion nozzle; controlling the relative values of the expansion in said nozzle and the predetermined temperature to produce a mixture velocity not substantially less than Mach 1; applying a transverse electric field across said gas in a direction perpendicular to the flow thereof adjacent the point of entry of said gas into said magnetic field to ionize said gas; controlling the relative values of said magnetic field and the density of said gas to provide a product of electron angular cyclotron frequency and mean collision time greater than unity; providing a completed electrical circuit including a load for electric current generated by the interaction of said magnetic field and said gas; maintaining a ratio of voltage across the load to open circuit voltage in the range of 0.5 to 0.9; and utilizing a potential gradient across said gas in a direction parallel to the flow thereof to increase the temperature of said electrons relative to that of said gas.

5. The method of claim 4 wherein said product of electron angular cyclotron frequency and mean collision time is maintained in the range of 3–5.

References Cited by the Examiner

UNITED STATES PATENTS

| | | | |
|---|---|---|---|
| 1,717,413 | 6/1929 | Rudenberg | 310—11 |
| 3,148,291 | 9/1964 | Rosa | 310—11 |
| 3,155,850 | 11/1964 | Meyer | 310—11 |
| 3,178,596 | 4/1965 | Brogan | 310—11 |

FOREIGN PATENTS

| | | |
|---|---|---|
| 1,161,079 | 3/1958 | France. |
| 841,613 | 6/1952 | Germany. |
| 738,511 | 10/1955 | Great Britain. |

OTHER REFERENCES

Conduction in Gases With Elevated Electron Temperature," published in Engineering Aspects of Magnetohydrodynamics, edited by Manual and Mather, pp. 327–346.

Publication: Power, Design and Application Section; November 1959, pp. 62, 63, and 64.

Progress in MHD Power Generation; published in Engineering Aspects of Magnetohydrodynamics, edited by Manual and Mather, pp. 147–165.

MILTON O. HIRSHFIELD, *Primary Examiner.*

ORIS L. RADER, DAVID X. SLINEY, *Examiners.*